United States Patent
Streit

(10) Patent No.: US 9,742,601 B2
(45) Date of Patent: Aug. 22, 2017

(54) POWER LINE CARRIER/COMMUNICATIONS WITH IMPROVED IMMUNITY FOR TRANSIENTS AND ELECTROMAGNETIC INTERFERENCES

(71) Applicant: ANALOG DEVICES, INC., Norwood, MA (US)

(72) Inventor: Lawrence C. Streit, Nobelsville, IN (US)

(73) Assignee: ANALOG DEVICES, INC., Norwood, MA (US)

( * ) Notice: Subject to any disclaimer, the term of this patent is extended or adjusted under 35 U.S.C. 154(b) by 350 days.

(21) Appl. No.: 14/506,824

(22) Filed: Oct. 6, 2014

(65) Prior Publication Data

US 2016/0099821 A1 Apr. 7, 2016

(51) Int. Cl.
| | |
|---|---|
| H02J 1/00 | (2006.01) |
| H02J 3/00 | (2006.01) |
| H04L 25/08 | (2006.01) |
| H04B 3/54 | (2006.01) |
| H04B 3/06 | (2006.01) |

(52) U.S. Cl.
CPC ............ *H04L 25/085* (2013.01); *H04B 3/06* (2013.01); *H04B 3/542* (2013.01)

(58) Field of Classification Search
CPC ............... H04L 12/10; H04L 12/40039; H04L 12/40045; H04L 25/02; H04L 25/0266; H04L 25/028; H04L 27/2601; H04L 12/00; H04L 12/02; H04L 12/40; H04L 12/66;

(Continued)

(56) References Cited

U.S. PATENT DOCUMENTS 4,052,656 A * 10/1977 Lavell ................. H02J 7/008
 320/156
4,055,804 A * 10/1977 Mayfield ............. G01R 21/00
 324/123 R (Continued)

OTHER PUBLICATIONS

Alpha & Omega Semiconductor, "AOZ8318 Low Capacitance 2.5 V TVS Diode", Rev. 1.0 Mar. 2014, www.aosmd.com, 8 pages.

(Continued)

*Primary Examiner* — Jared Fureman
*Assistant Examiner* — Esayas Yeshaw
(74) *Attorney, Agent, or Firm* — Patent Capital Group

(57) ABSTRACT

Power line carriers (PLCs) are susceptible to transients and electromagnetic interference (EMI) on the power line. To address transients and EMI on the power line, an improved power PLC involves transmitting a signal over the power line using a controlled current source, where the current source is modulated by the signal. The current source output is designed to be independent of the voltage on the power line and the load, and thus, is less susceptible to transients and EMI on the power line. The system architecture of the improved PLC also allows for simple, predictable, and flexible termination. In an example implementation in the automotive industry, the improved high frequency PLC may provide a low cost replacement for existing communication interfaces. The improved PLC may consolidate system in-vehicle communication, reduce in-vehicle wiring, provide system flexibility, and decrease vehicle weight and system cost.

19 Claims, 11 Drawing Sheets

(58) Field of Classification Search
CPC .............. H04L 1/16; H04L 2012/40221; H04L 2025/03356
See application file for complete search history.

(56) References Cited

U.S. PATENT DOCUMENTS

| | | | |
|---|---|---|---|
| 4,323,882 A | 4/1982 | Gajjar | |
| 4,371,867 A | 2/1983 | Gander | |
| 4,558,177 A | 12/1985 | Corris et al. | |
| 4,701,945 A | 10/1987 | Pedigo | |
| 6,177,778 B1 * | 1/2001 | Miller | H02J 7/0045 320/112 |
| 6,377,163 B1 * | 4/2002 | Deller | H02J 13/0031 307/2 |
| 7,173,345 B2 * | 2/2007 | Brandt | H02J 13/002 307/1 |
| 7,352,281 B2 | 4/2008 | Stevenson | |
| 7,560,825 B2 * | 7/2009 | Crawley | H04L 12/10 307/1 |
| 7,652,390 B2 * | 1/2010 | Vrla | H02J 7/0042 307/1 |
| 8,576,592 B2 * | 11/2013 | Jones | H02M 1/14 363/65 |
| 2010/0118983 A1 | 5/2010 | Weber et al. | |
| 2012/0299386 A1 * | 11/2012 | Kaufman | H02J 1/12 307/82 |
| 2013/0249429 A1 * | 9/2013 | Woytowitz | H05B 37/0209 315/246 |

OTHER PUBLICATIONS

Kezhen Liu et al., "A Study on the Transmission Line Transient Protection Containing Static Synchronous Compensator", Energy and Power Engineering, 2013, 5, 1192-1197, dio:10.4326/epe.2013.54B226 Published Online Jul. 2013, http://www.scirp.org/journal/epe, Scientific Research, Received Feb. 2013, © 2013 Sci Res., 6 pages.

On Semiconductor, NCN49597, "Power Line Communication Modem", © Semiconductor Components Industries, LLC, 2014, May 2014—Rev. 1—Publication Order No. NCN49597/D, http://onsemi.com, 29 pages.

Vishay General Semiconductor, Protection Diodes, Application Note, "Selecting Automotive Power Line Polarity Protection Diodes", Revision: Oct. 9, 2012, Document No. 89961, www.vishay.com, 9 pages.

Texas Instruments, "System-Level EDS/EMI Protection Guide", © Texas Instruments 2012, www.tj.com/esd, 41 pages.

Vishay General Semiconductor, Transient Voltage Suppressors, Application Note, "Transient Voltage Suppressors (TVS) for Automotive Electronic Protection", Revision Aug. 9, 2010, Document No. 88490, www.vishay,com, 4 pages.

Joseph Seymour, "Data Line Transient Protection", White Paper 85, Revision 1, Schneider Electric, Produced by Schneider Electric's Data Center Science Center, DSCS@Schneider-Electric.com, © 2011 Schneider Electric, 10 pages.

International Search Report and Written Opinion issued in International Patent Application Serial No. PCT/US2015/052545 mailed Jan. 12, 2016, 12 pages.

* cited by examiner

POWER LINE CARRIER/COMMUNICATIONS WITH IMPROVED IMMUNITY FOR TRANSIENTS AND ELECTROMAGNETIC INTERFERENCES

TECHNICAL FIELD OF THE DISCLOSURE

The present invention relates to the field of integrated circuits, in particular to power line carrier circuits usable for transmitting and/or receiving signals over a power line.

BACKGROUND

A modern electronic system often includes a variety of electronic modules that cooperate to provide rich functions for the overall system. For example, a car as a modern electronic system includes electronic modules such as climate control system, power window control system, steering control system, sensors, air bag safety system, and audio system, etc. Each electronic module is connected to a power line to receive power from a centralized power source, e.g., a direct current (DC) power source such as a battery. To cooperate with each other, the electronic modules can communicate with each other over a separate network of wires interconnecting the different electronic modules. Communicating over the separate network of wires can be reliable, but such a scheme can be costly due to the need to provide the network of wires and dedicated communication interfaces. In some cases, providing wires to interconnect the electronic modules is not possible or convenient.

To overcome this problem, power line carrier (or sometimes known as "power line communication") technologies have been developed to allow electronic modules to communicate over the power line which already interconnects the electronic modules to each other. The present disclosure refers to power line carrier or power line communication simply as PLC. PLC operates by allowing data to be carried over the power line which is also simultaneously used for delivering power to the electronic modules. One example technology used in households is X10, which can be used for different appliances to communicate with each other in a home. For instance, X10 allows temperature readings to be transmitted from one thermostat in one part of a home over the power line to a climate control system in another part of the home. In this example, the power source is an alternating (AC) power source instead of a DC power source (note that PLC can be used for DC and AC power lines).

OVERVIEW

Power line carriers (PLCs) are susceptible to transients and electromagnetic interference (EMI) on the power line. To address transients and EMI on the power line, an improved PLC involves transmitting a signal over the power line using a controlled current source, where the current source is modulated by the signal. The current source output is designed to be independent of the voltage on the power line and the load, and thus, is less susceptible to transients and EMI on the power line. The system architecture of the improved PLC also allows for simple, predictable, and flexible termination. In an example implementation in the automotive industry, the improved high frequency PLC may provide a low cost replacement for existing communication interfaces. The improved PLC may consolidate system in-vehicle communication, reduce in-vehicle wiring, provide system flexibility, and decrease vehicle weight and system cost.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Understanding Communication Systems which do not Transmit Communication Signals Over the Power Line Modern electronic systems are complex, and more often than not, would include many varied electronic modules for performing a wide range of functions. Generally, electronic modules are connected to a power line to receive power from a centralized power source such as a battery, or some other suitable power source.

Figure 1:
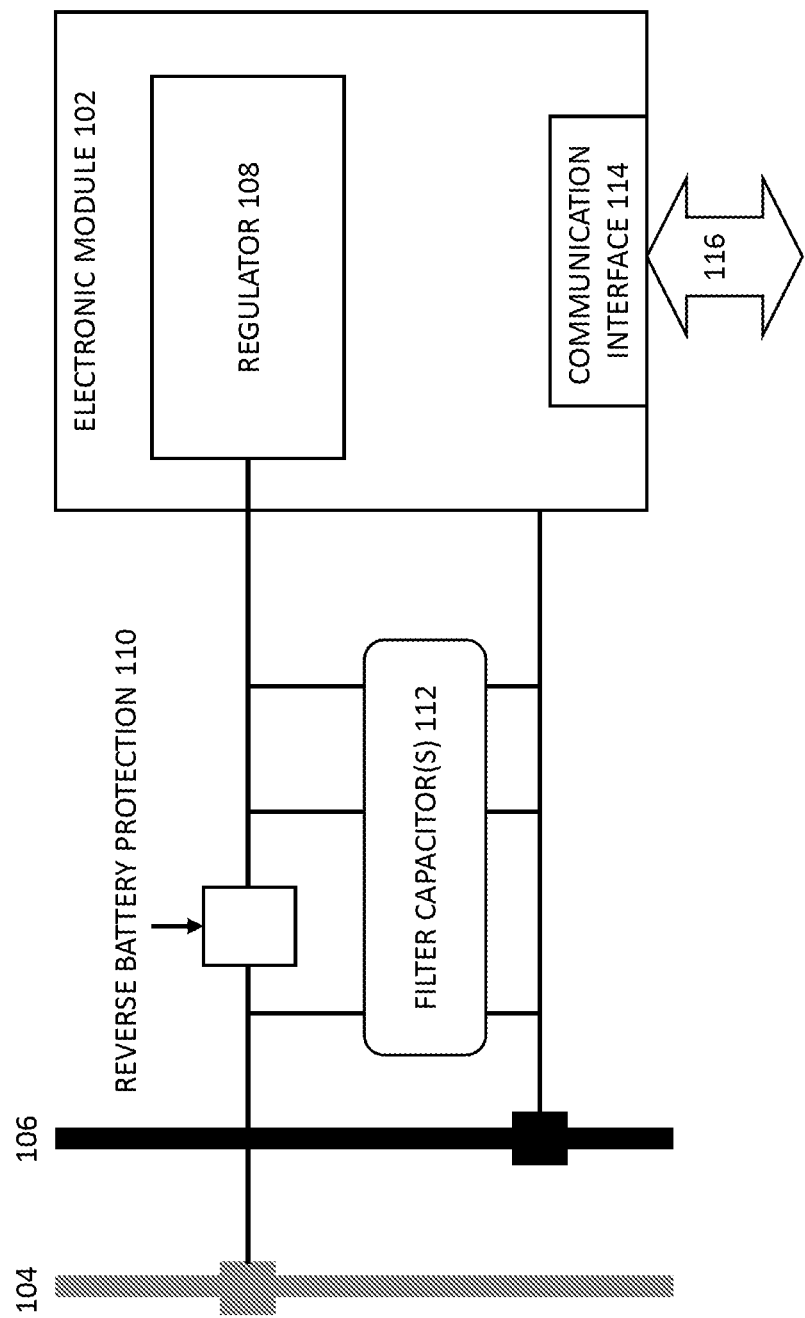
FIG. 1 shows an electronic module connected to a power line and communicates with other electronic modules over a separate communication interface.

FIG. 1 shows an electronic module connected to a power line and communicates with other electronic modules over a separate communication interface. For simplicity, one electronic module among the many possible electronic modules is shown and described. Referring to FIG. 1, the electronic module 102 is connected to the positive power line 104 and the negative (or ground) power line 106. The electronic module 102 may receive power from the power lines 104 and 106 via regulator 108 to ensure the power is conditioned to operate with the electronic module 102.

Between the electronic module 102 and the power lines, reverse battery protection 110 can be provided to prevent reverse battery installation or other abnormal configuration of the power line from damaging electronic modules 102. The function of the reverse battery protection 110 can be provided using a diode in series with the power line to ensure normal operating current flows. In some other cases, the function of reverse battery protection 110 can be provided using metal-oxide-semiconductor field-effect transistors (MOSFETs). Furthermore, some filter capacitor(s) 112 (or some other filtering electronics) are provided to filter out undesirable signals, e.g., such as noise, transients, and electromagnetic interference (EMI).

In automotive, the varied electronics modules such as electronic module 102 may include one or more of the following: engine electronics, transmission electronics, chassis electronics, active safety electronics, sensor electronics, driver assistance electronics, passenger comfort electronics, infotainment electronics, etc. Many of such electronic modules may communicate with each other to cooperate and provide many useful functions. For example, driver assistance electronics may communicate with engine electronics to command the engine to slow down, or an infotainment system may communicate with engine electronics to request the current temperature of the engine for display on a monitoring system.

To communicate with other electronic modules, the electronic module 102 includes a communication interface 114 such that the electronic module 102 can transmit and/or receive signals over a network of cables 116 separate from the power lines. Exemplary communication interfaces include SENT for power train electronics, LIN for body electronics, or CAN for power train electronics. Providing the network of cables 116 can be costly, and in some cases, inconvenient to implement due to, e.g., space constraints. Furthermore, the network of cables 116 can add weight to the system, which can be undesirable.

Basics of PLCs and Several High-Level Design Challenges

To address this issue, PLCs allow data to be transmitted and/or received over existing power lines which already interconnect the electronic modules of the overall system. PLC refers to a communication mechanism for transmitting and/or receiving data over power line cables. One goal of the PLC is to replace the conventional (complex) communication interfaces and transmit data over the power line. Rather than using a separate network of cables, data is transmitted and/or received over the power line. The result would eliminate or reduce wiring for the overall system, and accordingly can decrease weight of the system, costs, and implementation complexity.

Figure 2:
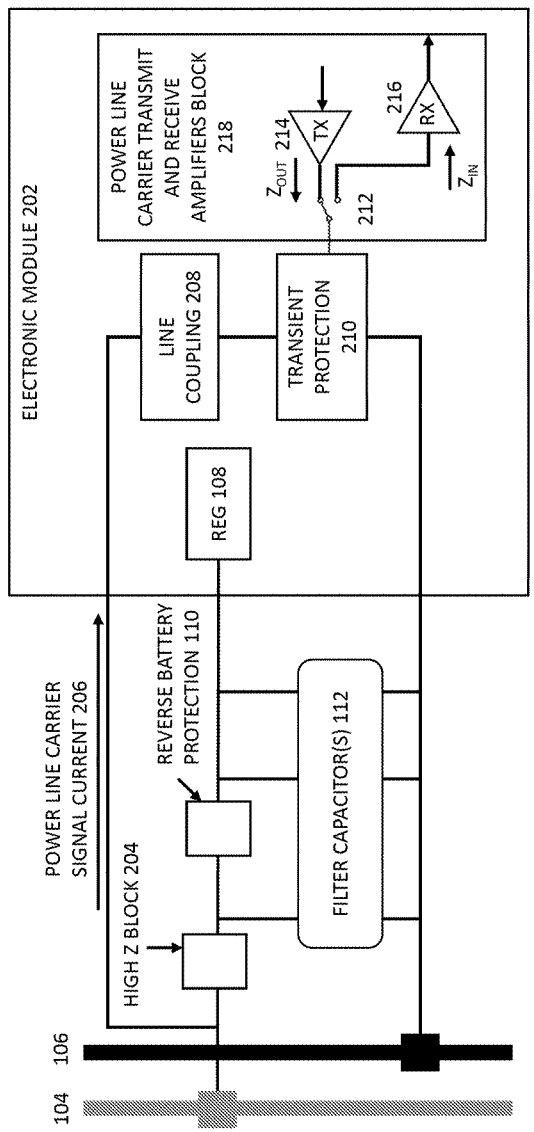
FIG. 2 shows an electronic module having a PLC.

FIG. 2 shows an electronic module having a PLC. The interface between the power lines 104 and 106 and the electronic module 202 includes a high Z block 204, besides the reverse battery protection 110 and filter capacitor(s) 112. In this example, the high Z block 204 provides high impedance for blocking alternating current (AC) signals, such as the PLC signal (as well as blocking transients and EMI), while providing low impedance for passing direct current (DC) signals. For example, the high Z block 204 can include an inductor, capacitor, or any suitable device(s). The high Z block 204 can block the PLC carrier frequency (e.g., at 30 MHz). The PLC signal current 206 (e.g., having a PLC carrier frequency at around 30 MHz) can then bypass the blocked path (i.e., not go through the high Z block 204). The PLC signal current 206 (e.g., at 30 MHz) would then go (via the path with lower impedance than the path through the high Z block 204) towards and through line coupling 208. For medium to low voltage power lines, line coupling 208 can include capacitive coupling; for high voltage power lines, line coupling 208 can include a transformer to condition the voltage level along with capacitive coupling.

While having a PLC is convenient and can reduce costs and lower weight of the overall system by obviating the need to provide a separate network of wires to interconnect electronic modules, PLC is susceptible to negative effects from, e.g., electromagnetic interference (EMI) on the power line. EMI relates to voltage changes in the power line caused by electromagnetic induction, capacitive coupling, or radiation on the power line. The changes caused by EMI can disrupt data bit(s) being carried over the power line, and lead to bit errors within frames or data packets being transmitted from one electronic module to another electronic module. While the power line interfaces with the regulator 108 with filter capacitor(s) 112 and high Z block 204 (together providing a filtering function) to reduce effects from electromagnetic interference (EMI) on the electronic module 202, a different approach may be needed for the PLC implementation because EMI can be in the same frequency band as the carrier frequency band. For example, EMI can be within a range from 1 Megahertz to 1 Gigahertz while carrier frequency can be within an exemplary range from 1 Megahertz to 50 Megahertz. A filter that filters out all EMI would also filter out the PLC signal.

Besides negative effects from EMI, PLC is susceptible to negative effects from, e.g., transients on the power line, which can disrupt the data being carried on the power line and even destroy components in the electronics module 202. Transients are the voltage spikes on the power line where the voltage on the power line momentarily increases or decreases in a matter of a fraction of a second. Transients can be capacitively coupled, inductively coupled, or directly coupled (e.g., a load dump) onto the PLC. Rise times/fall times can range from 5 nanoseconds to 400 milliseconds, with peak voltages of ±50-60 volts or more.

The negative effects from both EMI and transients can often disrupt PLC signals, thereby reducing the effective data rate. When PLC signals are disrupted, one or more bits of data in a frame may be incorrect. For instance, if an error checking code of a frame or packet indicates the bits are incorrect, a transmitter may need to re-transmit the frame or packet. In some cases, the negative effects can even damage the electronic modules, if no transient or EMI protection is provided. For these reasons, many challenges remain when designing a PLC. Broadly speaking, design issues can relate to cost, complexity, and data rate. While some form of protection can be provided to protect the electronic modules, some implementations can be costly or inefficient. Furthermore, many of the protection schemes may disrupt PLC signals when the protection scheme is operating in the presence of transients and EMI (disruptions reduce effective data rate).

Problems with Some Transient Protection Mechanisms

Figure 5:
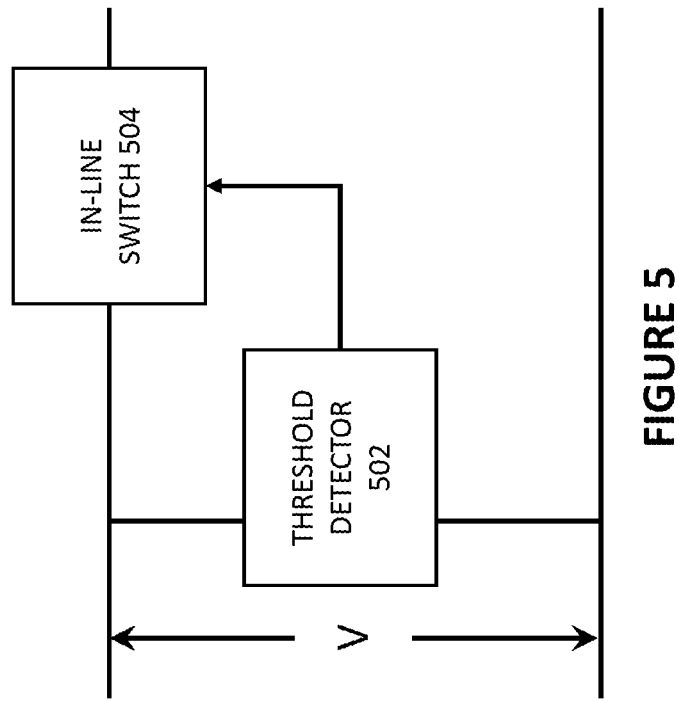
FIGS. 3-5 show exemplary transient protectors.
Figure 3:
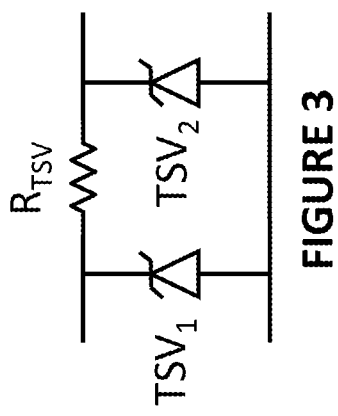
Figure 4:
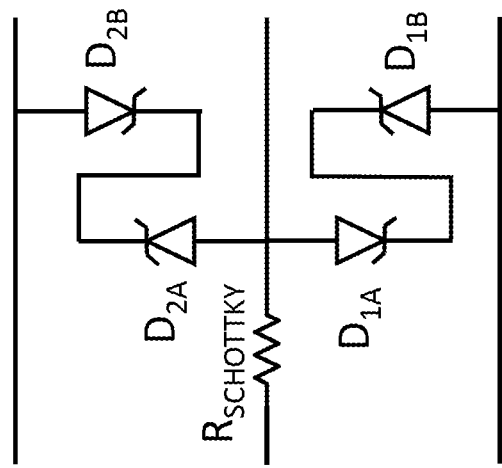

As seen in FIG. 2, the PLC signal current 206 at 30 MHz reaches transient protection 210 after line coupling 208. Transient protection 210 interfaces with PLC transmit and receive amplifiers block 218, to provide some protection against transients, i.e., sudden voltage spikes on the power line. For instance, transient protection 210 can block excessive transients from reaching the PLC transmit and receive amplifier block 218. While transient protection 210 prevents excessive transients from damaging electronic module 202, some possible implementations for transient protection 210 may disrupt the data bit(s) being carried on the power line. Several possible implementations having these shortcomings are illustrated in FIGS. 3-5. These implementations either become high impedance or low impedance in the presence of transients, and blocks PLC transmission. Transmission errors caused by an activated transient protector 210 may lower effective data rate.

FIG. 3 shows one exemplary implementation of a transient protection 210 of FIG. 2 using transient voltage suppressors (TSVs). In one example, transient voltage suppressors can include diodes, e.g., Zener diodes, for protecting against overvoltages. When an excessive transient is present on the power line, $TSV_1$ absorbs a substantial amount of the transient's energy. Series resistor $R_{TSV}$ and a lower energy $TSV_2$ can absorb most of the remaining energy. While these transient voltage suppressors are effective for absorbing excessive transients, these transient voltage suppressors, when activated, disrupt transmission or receipt of PLC signals. This is because when the TSVs are turned on to suppress the excessive transient, the TSVs become extremely low impedance, or substantially a short (i.e., attenuates the signal).

FIG. 4 shows another exemplary implementation for transient protection 210 of FIG. 2 using Schottky diodes, back to back. When an excessive transient is present on the power line, resistor $R_{SCHOTTKY}$ absorbs some of the energy, and so do the Schottky diodes (diodes $D_{1A}$, $D_{1B}$, $D_{2A}$, and $D_{2B}$). The implementation shown in FIG. 4 has the same advantage of being able to suppress transients as the transient voltage suppressors of FIG. 3. Unfortunately, the implementation shown in FIG. 4 becomes substantially a short in the presence of excessive transients because the diodes becomes low impedance when they are turned on (i.e., becomes substantially a short and attenuates the PLC signal). For this reason, the effective data rate of this implementation may be decreased due to the activated transient protection disrupting transmission or receipt of PLC signals when the transient protection mechanism is operating to suppress the excessive transient.

FIG. 5 shows yet another implementation for transient protector 210 of FIG. 2 using a threshold detector 502 which opens an in-line switch 504 if the voltage V is above a particular threshold. When the in-line switch 504 is opened, the activated transient protector goes high impedance (i.e., PLC signal cannot go through) and again disrupts the signal carried on the power line. Again, the effective data rate of this implementation may be decreased due to the activated transient protector disrupting transmission or receipt of PLC signals when the transient protection mechanism is operating to suppress the transient.

Broadly speaking, the transient protector implementations provided on the power line (e.g., ones shown in FIGS. 3-5) which goes high impedance or low impedance in the presence of transients has the issue of the PLC signal being disrupted when the transient protector is activated to suppress or remove a transient. Put differently, these implementations, when activated, either shorts out the line to protect the electronics or it opens up the line to protect the electronics. In either event, the activated transient protector disrupts the transmission. If a transient occurs on the power line in the middle of a frame or packet of data being carried on the power line, the transmission is interrupted and the frame or packet may need to be re-transmitted. This may decrease the effective data rate.

Exemplary Problems with a Power Line Transmit and Receive Amplifier Block

Referring back to FIG. 2, a switch 212 in PLC transmit and receive amplifiers block 218 can control when to transmit signals (e.g., connecting the transmit amplifier 214 to transient protection 210) and when to receive signals (e.g., connecting the receive amplifier 216 to transient protection 210). The exemplary implementation shown for the PLC transmit and receive amplifiers block 218 has several shortcomings. For instance, the switching mechanism means a full duplex PLC cannot be implemented. Furthermore, the implementation requires the use of a switch 212 for switching between transmit and receive, which adds complexity to the system. Moreover, the system performance is difficult to predict because of the uncharacterized impedances on the power line. Any static or dynamic changes on the power line can make the load for the transmitter amplifier 214 unpredictable, thereby causing the transmitter amplifier 214 to become unstable.

The implementation also has a design challenge related to termination. For transmission lines, in this case the power lines, it is advantageous to control overall system termination between end points (e.g., for electronic module 202) to improve signal transfer and minimize signal loss. Broadly speaking, signal transfer can depend on the impedance at the source of the transmission line, the characteristic AC impedance of the transmission line, and the impedance at the destination of the transmission line. If overall system termination is predictable, efficient signal transfer between the source and the destination can be more easily achieved. Without predictable overall system termination, signals being carried by the power line can be severely altered, leading to signal loss.

Referring back to FIG. 2, when the transmit amplifier 214 is connected via switch 212 to transient protection 210, the PLC transmit and receive amplifiers block 218 is in a "transmit mode", with an impedance $Z_{OUT}$. When the receive amplifier 216 is connected via switch 212 to transient protection 210, the PLC transmit and receive amplifiers block 218 is in a "receive mode" with an impedance $Z_{IN}$. In other words, the implementation has a difference between the impedances $Z_{OUT}$ (output impedance at the output of the transmit amplifier 214, usually low impedance) and $Z_{IN}$ (input impedance at the input of the receive amplifier 216) due to the switching scheme. This difference in termination means the termination of electronic module 202 would vary between transmit and receive modes, which could make overall system termination difficult to predict because the impedance is not constant for the node at switch 212. Depending on the number of electronic modules trying to transmit or receive, or which ones are transmitting or receiving, the effective power line impedance can also vary drastically. If the overall system termination is predictable, or even better, controllable, signal transfer over the power line can be better accounted for.

The switching scheme and changing termination impedances at different electronic modules also causes transmission problems. If many electronic modules are attempting to transmit and switches to their respective transmit amplifier (which may have a low output impedance), a PLC signal being transmitted from one termination point would be severely attenuated when the PLC signal reaches the other termination point because many electronic modules are at low impedance. If many electronic modules are attempting to receive and switches to their respective receive amplifier (which may have a high input impedance), the receive amplifiers would be more susceptible to EMI because there is no low impedance path for the EMI to be absorbed.

Overview of the Improved PLC

Figure 6:
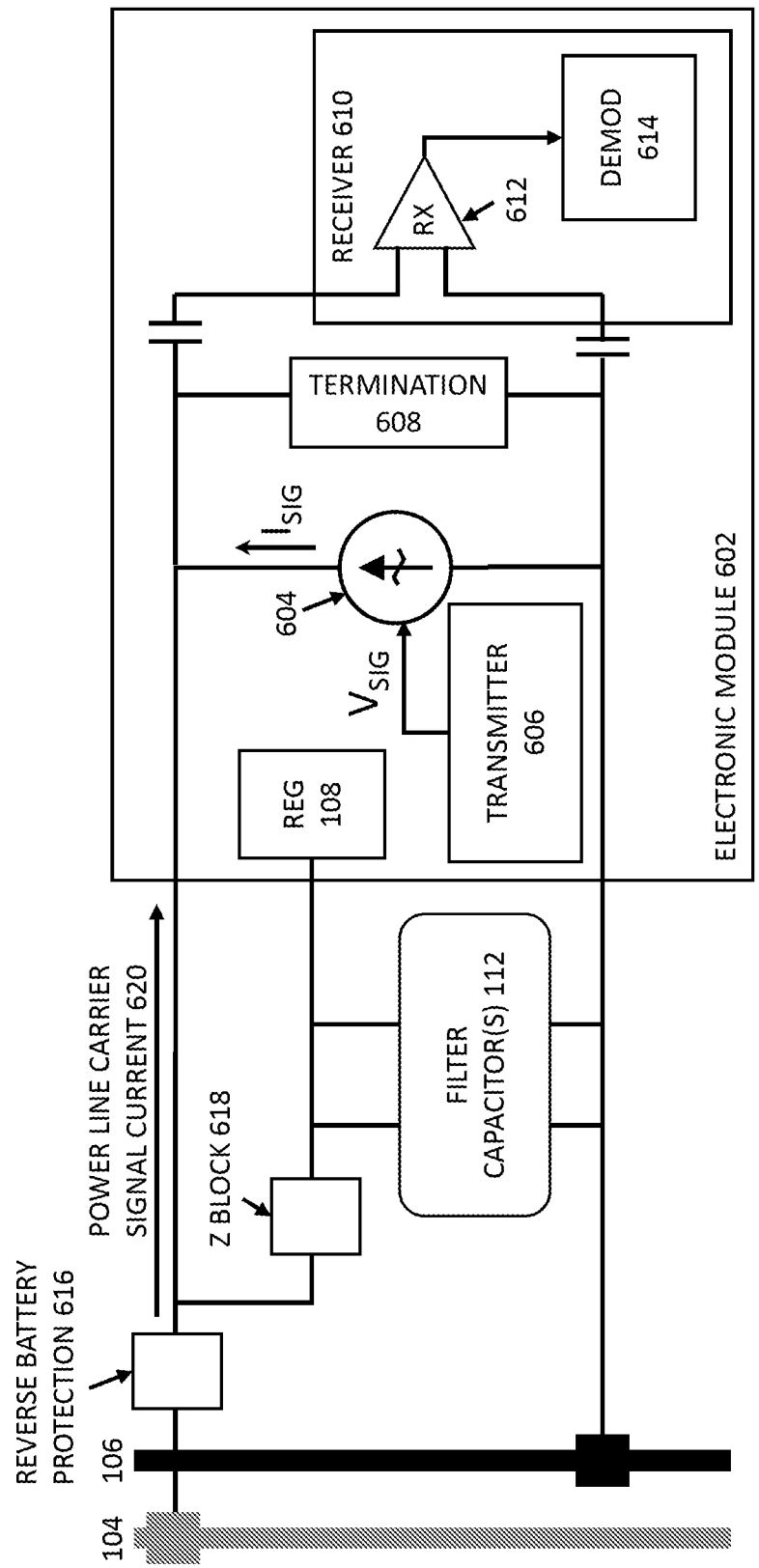
FIG. 6 shows an exemplary electronic module having an improved PLC, according to some embodiments of the disclosure.

To address one or more of the issues described above, an improved PLC includes a new and inventive approach to transmitting and/or receiving signals over the power line. FIG. 6 shows an exemplary electronic module having an improved PLC, according to some embodiments of the disclosure. The example shown can be used in automotive to provide an improved high frequency PLC on an automotive 12 volt battery bus, as well as to provide a low cost replacement for communication interfaces such as LIN, SENT, and low speed CAN (e.g., less than 250 Kb/SEC). The improved PLC may consolidate system in-vehicle communication, reduces in-vehicle wiring, provide system flexibility, and decrease vehicle weight and system cost.

Referring to FIG. 6, the improved electronic module 602 includes a circuit for transmitting and/or receiving signals over a power line in the presence of transient(s) and EMI on the power line, enabling improved PLC in electronic module 602. Specifically, the circuit includes a current source 604 having an output current $I_{SIG}$ connected to the power line (e.g., power line 104) for transmitting a signal over the power line. This is deliberately different from the implementation seen in FIG. 2, which includes a voltage source for transmitting the signal over the power line.

The output current $I_{SIG}$ is modulated by a transmit signal from a transmitter 606. In some embodiments, transmitter 606 is system implementing a modulation scheme, e.g., frequency-shift keying, where digital information is carried in the transmit signal through discrete frequency changes of a carrier wave of the transmit signal. The modulated output current $I_{SIG}$ is substantially independent of load at the output of the current source. Furthermore, the output current $I_{SIG}$ is substantially independent of voltage on the power line. Moreover, an output impedance of the current source is controlled. In other words, the output impedance can be designed to be always high, or constantly high, does not vary depending on the load or change arbitrarily based on factor(s).

Transmitting signals over the power line with current source 604 provides a variety of advantages. For example, if the current source 604 is provided with proper electronics that can withstand or handle high voltages on the power line, the current source 604 eliminates the need for transient protection because the output current $I_{SIG}$ can be provided without being affected by the high voltages caused by transients (or EMI). In another example, the controlled output current $I_{SIG}$ can advantageously improve EMI emissions. Generally speaking, EMI related to radiation can be caused by uncontrolled currents in conductors such as power lines. By ensuring the current amplitude of $I_{SIG}$ from the current source 604 remains controlled within reasonable limits, the power lines would emit or generate less conducted radiation in the overall system. Note that transmitting signals using a voltage source would not have the same advantage because the load on the power line can change unexpectedly, thereby causing the current on the power line to vary significantly. In yet another example, the controlled output current $I_{SIG}$ being independent from the load of the power line makes the current source 604 stable even when the load varies. In yet a further example, the current source does not affect termination impedance for electronic module 602 (e.g., allowing the termination to be provided by another easily controllable component) or have the same overall system termination predictability issue as the switching mechanism seen in FIG. 2. Other advantages can include enabling the reduction of non-integrated (off-chip) component count by reducing the need to have transient voltage suppressors or other external components to provide transient protection. The low off chip component count may enable a lower cost PLC solution. By ensuring that signals can be transmitted and/or received even in the presence of transients or EMI, the effective data rate may be increased over other possible solutions.

Further to providing a current source to transmit a signal as an output current of the current source, the circuit can further include a termination component 608 connected to the power line (e.g., power line 104, and power line 106) in parallel with the current source. This termination component 608 is explained in further detail in a later section, including details of how to control the termination component 608 for electronic module 602.

Also in parallel with the current source, the circuit can include a receiver 610 connected to the power line (e.g., capacitively coupled to power line 104, and power line 106) for receiving signals carried on the power line. Because the coupling does not involve a switching mechanism between the receiver 610 and the modulated current source 604, the PLC of electronic module 602 is advantageously full duplex capable. The receiver may include a receive amplifier 612 for receiving signals transmitted on the power line. The output of the receive amplifier 612 can be provided to a demodulator 614 to filter out undesirable signal content and keep signal content in a frequency band of interest, e.g., the carrier frequency. Further processing may be provided to filter and extract the signal transmitted over the power line. Some details of the receiver amplifier 612 are described in relation to FIG. 13.

The interface between the power lines 104 and 106 can include reverse battery protection 616 to protect both the circuit for transmitting signals in the electronic module 602 (e.g., an output driver of the modulated current source 604) and the regulator 108. Besides protecting the circuits, the reverse battery protection 616, depending on the implementation, can provide a secondary function for blocking negative voltage transients. A Z block 618 is included to provide sufficiently high impedance for blocking AC signals, such as the PLC signal, transients, and/or EMI, while providing low impedance for passing DC signals. For example, the Z block 618 can include an inductor, capacitor, or any suitable device(s). In some cases, the Z block 618 together with filter capacitor(s) 112 can provide a filtering function for preventing EMI and transients from reaching regulator 108. In one instance, the Z block 618 can block the carrier frequency (e.g., at 30 MHz), and the PLC signal current 620 (e.g., having a carrier frequency at around 30 MHz) can then bypass the blocked path (i.e., not go through the Z block 618, but goes to the circuit for transmitting and/or receiving signals in the electronic module 602).

Using the system shown in FIG. 6, an improved method for transmitting and/or receiving signals over a power line in the presence of transient(s) and electromagnetic interference on the power line can be implemented. The method includes generating a transmit signal using a transmitter 606, and modulating an output current $I_{SIG}$ of a current source 604 connected to the power line (e.g., power line 104) using the transmit signal.

Flexibility in Termination Control

One advantage of the improved PLC illustrated in FIG. 6 is the ability to better control termination impedance for electronic module 602, thereby making the overall system termination more predictable. The system now has the ability or design freedom to select one of three possible components or combination of one or more of the three possible components as the dominant termination component of the system. The impedance of the current source 604 is controlled (i.e., does not vary when the circuit is transmitting or receiving), and thus would not affect the termination. Furthermore, a designer or engineer can select one or more of: the Z block 618, the termination component 608, or the receiver 610 (e.g., the receive amplifier 612) as the dominant termination component for electronic module 602. As discussed in relation to FIG. 2, other PLCs would normally not maintain consistent termination between the transmit and receive amplifiers. By having controlled termination, it is thus possible to control overall system termination between transmit and receive modes more easily, the transmission of signals would be more predictable, and efficient signal transfer can be more easily achieved.

In some embodiments, the receiver 610, i.e., the receive amplifier 612 having a fixed input impedance, can be the dominant termination for electronic module 602. In some embodiments, the Z block 618 can be the dominant termination for electronic module 602. In such embodiments, there may not be a need for providing termination component 608.

In some embodiments, it is not convenient to use the Z block 618 as the termination for electronic module 602 since it is not easily accessible to the electronic module 602. For that reason, it may be more convenient to provide termination component 608 as the dominant termination of electronic module 602. The termination component 608 may include one or more resistors (and one or more capacitors). A simple design for the termination component 608 could allow the termination component 608 to be controllable or parameterizable based on one or more factors. For instance, the size or number of resistors and/or capacitors can be switched in and out to change the impedance of the termination component 608.

The flexibility of the termination component 608 or some other suitable termination allows for the termination component 608 to be adjustable to improve signal transfer, e.g., based on a measurement made by the receiver 610. The optimal overall system termination may be selected based on the signal level of the transmitting circuit. In some embodiments, the receiver 610 can monitor the signal level. If the signal level indicates that the transmitting circuit is achieving efficient signal transfer, then the termination does not need to be adjusted substantially. However, if the signal level indicates that transmitting circuit is not achieving efficient signal transfer, the termination component 608 can be adjusted to improve signal transfer. The system architecture advantageously allows the termination at the electronic module 602 to be easily adjustable, and thus the overall system termination as well to be adaptive to achieve efficient signal transfer.

Note that the flexibility of the termination may also provide greater design freedom for selecting a suitable value of the node termination impedance based on transients and EMI expected on the power line. Generally speaking, based on the expected signal level of the transients and EMI on the power line, the value of the node termination impedance may be selected to ensure the signal level of the transients and EMI is not converted into a substantial voltage at the terminating node and thus saturating the receive amplifier in receiver 610. For instance, as the signal level of the transients and EMI increases to a higher level, the value of the node termination impedance could be decreased in order to not exceed the capabilities of the receive amplifier in receiver 610 (e.g., input voltage). As the value of the node termination impedance on receive node decreases, the output current of the transmit node may be increased to maintain the same signal level on the power line to improve the signal to noise ratio. When the termination is flexible and controllable, a designer can leverage the design freedom to potentially improve the terminating node's transient and EMI immunity.

Besides the above-mentioned advantages, the termination component 608 can advantageously be implemented for both the single-ended case (which the FIGURES of this application generally illustrate, where one power line is tied to ground plane) and the differential case (where the power lines 104 and 106 both float with respect to ground plane). One skilled in the art would appreciate that the embodiments herein for the single-ended case can be implemented for the differential case as well. To provide differential termination, the termination component 608 be implemented using components as simple as having two resistors to provide balanced differential termination over a wide range of frequencies (i.e., having a wide bandwidth). If an amplifier was relied upon as the dominant termination component (e.g., as in the system shown in FIG. 2), the common mode rejection capability would have been limited to a range of frequencies that the amplifier is able to provide common mode rejection. The architecture having termination component 608 configured in this manner as shown in FIG. 6 thus provides ease of design even in the differential case (e.g., for use with Low Voltage Differential Signaling).

Overview of a Transmitter System

As described above, a current source 604 of FIG. 6 is used as part of a transmitter system for transmitting signals onto the power line as an output current $I_{SIG}$. A transmitter 606 provides a signal $V_{SIG}$ to the current source 604. The current source 604 has an output current $I_{SIG}$ which is modulated by the signal $V_{SIG}$. The output current $I_{SIG}$ is modulated substantially independent of load at the output of the current source 604, and substantially independent of voltage on the power line.

Figure 7:
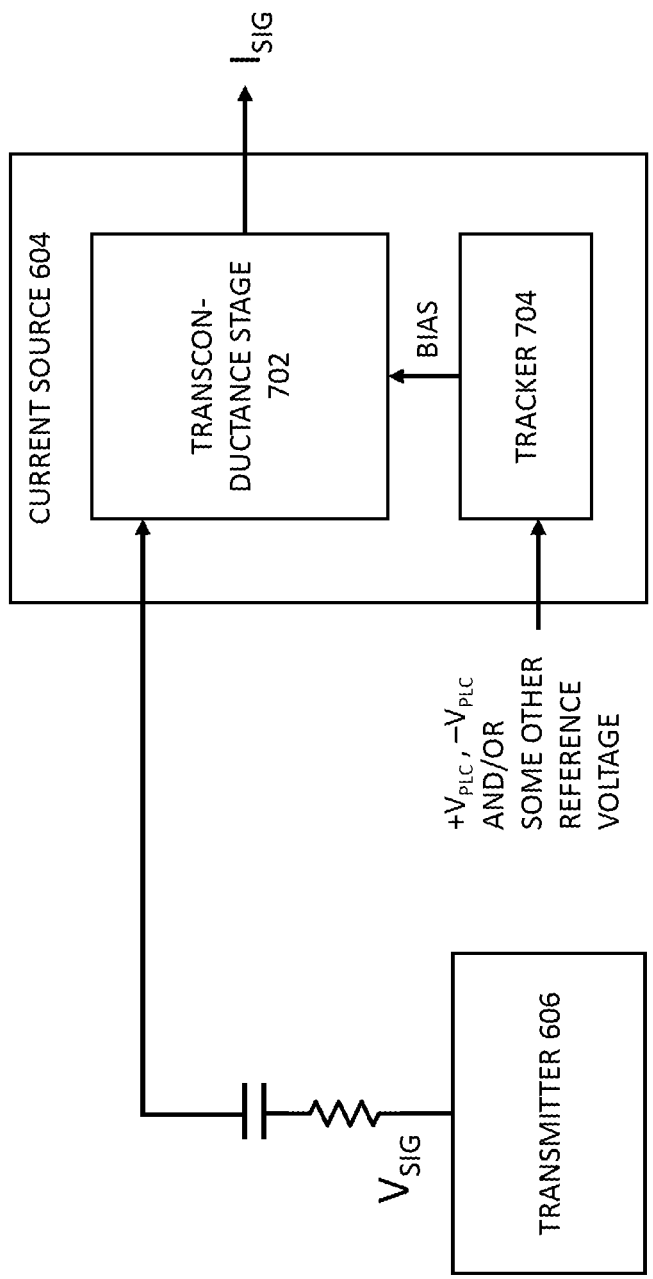
FIG. 7 shows an exemplary PLC system architecture having a transmitter providing a transmit signal $V_{SIG}$ and a current source having an output current $I_{SIG}$, according to some embodiments of the disclosure.

FIG. 7 shows an exemplary PLC system architecture having a transmitter 606 providing a transmit signal $V_{SIG}$ and a current source 604 having an output current $I_{SIG}$, according to some embodiments of the disclosure. In this exemplary system, the current source 604 includes a transconductance stage 702 that provides an output current $I_{SIG}$. The output current $I_{SIG}$ is modulated by the transmit signal $V_{SIG}$. In other words, the transconductance stage 702 (or a "transconductance amplifier" converts a voltage, i.e., the transmit signal $V_{SIG}$, into current, i.e., the modulated output current $I_{SIG}$.

The current source 604 including the transconductance stage 702 can be implemented in different ways. For instance, a transistor device (referred herein as a "transistor") can be implemented as a current source, where the transmit signal $V_{SIG}$ is used to modulate a current at a terminal of the transistor (e.g., the emitter) according to the transmit signal $V_{SIG}$. One or more devices within the transconductance stage 702 is preferably operating within a linear operating region such that the output current $I_{SIG}$ can be modulated (e.g., to provide an output current $I_{SIG}$ according to the transmit signal $V_{SIG}$ with substantially linear behavior). In other words, the one or more devices should not be operating in breakdown or saturation regions (i.e., where output current $I_{SIG}$ would not modulate). Furthermore, the transconductance stage 702 can operate with reference to one or more reference voltages, such as the voltages on the power lines $+V_{PLC}$ and $-V_{PLC}$ (taking +$V_{PLC}$ and −$V_{PLC}$ as the positive rail and negative rails, respectively, of the transconductance stage 702), or some other suitable combination of reference voltages. The one or more device(s) of the transconductance stage 702 (e.g., the device which is modulated by the transmit signal $V_{SIG}$) can be selected to have a suitable bandwidth to operate at the PLC carrier frequency.

If a transient (e.g., spike in the voltage) or EMI (e.g., radio-frequency interference) is present on the power line (e.g., +$V_{PLC}$ and/or −$V_{PLC}$), the transconductance stage 702 continues to operate in the linear operating region to provide the output current $I_{SIG}$ according to the transmit signal $V_{SIG}$ even in the presence of transients or EMI. This would ensure that the output current of the transconductance stage 702 is independent from transients and EMI on the line. For this reason, the current source 604 may further include a tracker 704 which biases the device(s) in the transconductance stage 702 to operate in the linear operating region even in the presence of transients or EMI on the line. The tracker 704 can provide a bias voltage or bias current to properly bias the device(s) in transconductance stage 702. The tracker can provide device(s) that can track +$V_{PLC}$ and/or −$V_{PLC}$ and/or include high voltage electronics connected to +$V_{PLC}$ and −$V_{PLC}$ to absorb high voltages on the power lines and ensure the devices(s) in transconductance stage 702 to remain in the linear operating region even in the presence of transients or EMI.

Exemplary Circuit Architectures of Transmitter Systems

Figure 8:
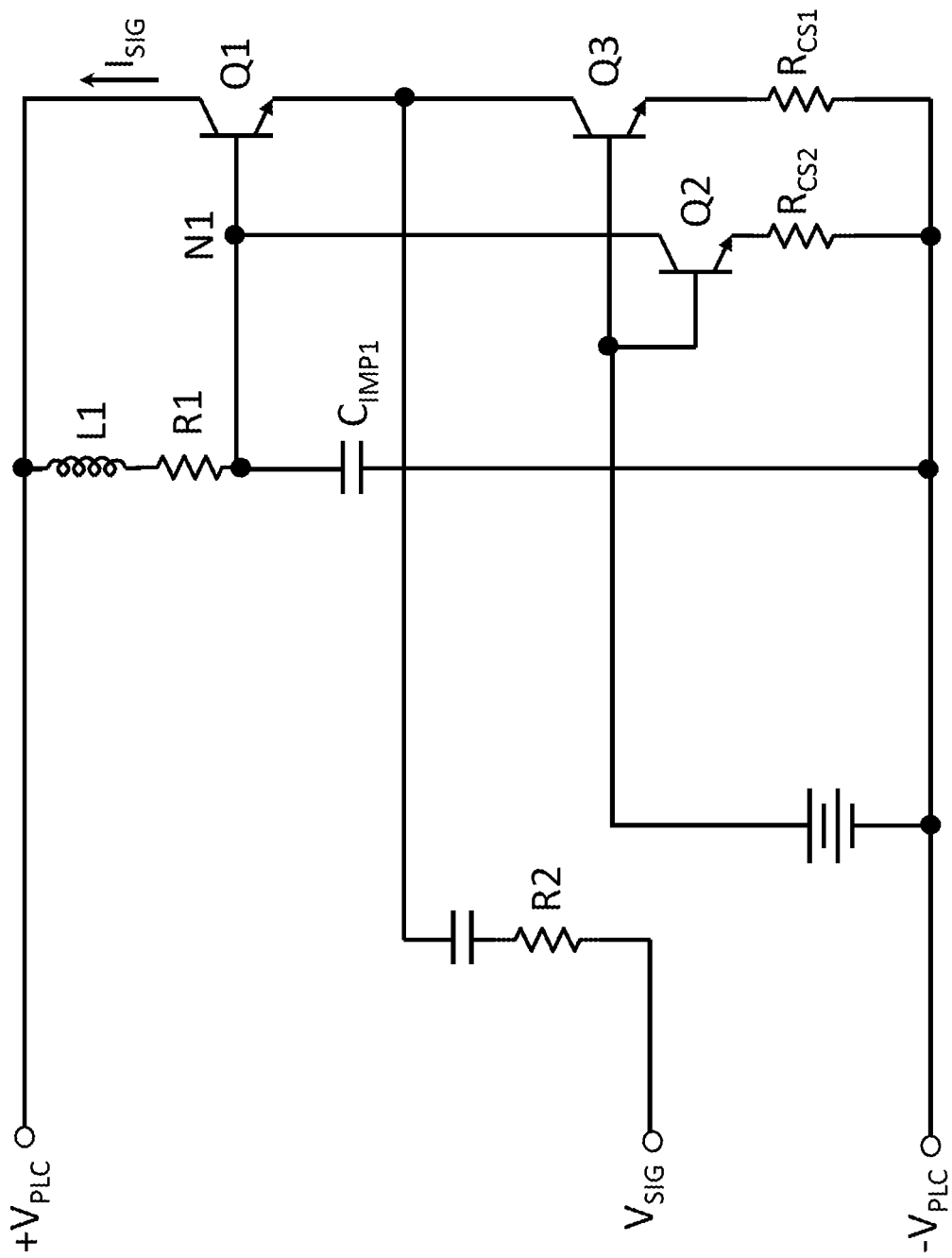
FIG. 8 shows an exemplary circuit architecture of a current source having an output current $I_{SIG}$ connected to the power line, wherein the output current $I_{SIG}$ is modulated by a transmit signal $V_{SIG}$ from a transmitter, according to some embodiments of the disclosure.

FIG. 8 shows an exemplary circuit architecture of a current source having an output current $I_{SIG}$ connected to the power line, wherein the output current $I_{SIG}$ is modulated by a transmit signal $V_{SIG}$ from a transmitter, according to some embodiments of the disclosure. A current source can be implemented using a bipolar junction transistor (BJT) Q1, wherein the collector of the Q1 is connected to +$V_{PLC}$ to provide the output current $I_{SIG}$ modulated by the transmit signal $V_{SIG}$ onto the power line. This embodiment is particularly useful in applications where the power line is a direct current power line, and the devices shown in FIG. 8 are provided to ensure continued operation if there are transients or EMI on the line.

By providing a path between +$V_{PLC}$ and −$V_{PLC}$ having inductor L1, resistor R1, and transistor Q2, the base of transistor Q1 can be biased using the voltage at a node N1 between R1 and collector of Q2. The voltage at N1 relative to +$V_{PLC}$ is fixed by the current provided by the collector of Q2 times R1, and as a result, the collector to emitter voltage at Q1 is maintained at a constant level even during transients and EMI on +$V_{PLC}$. A static (bias) current for Q1 can be provided by transistor Q3, or some other suitable device acting like a current source (such as a resistor). The output driver in this implementation, i.e., emitter of Q1, is tracking fluctuations at +$V_{PLC}$ while keeping the output driver in the linear operating region (i.e., meeting voltage requirements for the collector to emitter voltage to ensure Q1 is not in breakdown or saturation region).

The transistor Q2 can be a high voltage device to ensure that Q2 does not breakdown in the presence of high voltages on the power line (i.e., ensuring that the collector to emitter voltage of transistor Q2 does not exceed the transistor Q2's breakdown-voltage). Note that transistor Q2 helps absorb transients on the power line to ensure Q1 continues to operate in the linear region while not requiring Q1 to be a high breakdown voltage device.

The signal current $V_{SIG}/R2$ can be injected at the emitter of Q1 (which has a low AC impedance to ground due to the capacitor $C_{IMP1}$ connected to the base of Q1) to modulate the output current $I_{SIG}$ according to the transmit signal $V_{SIG}$. The circuit architecture advantageously provides a transconductance stage converting the transmit signal $V_{SIG}$ to the modulated output current $I_{SIG}$ (also provides the overall the current source) that is independent of transients and EMI on +$V_{PLC}$.

Depending on the PLC carrier frequency, the device Q1 driving the output current $I_{SIG}$ according to the transmit signal $V_{SIG}$ is preferably selected to have the appropriate bandwidth to operate at the PLC carrier frequency. Furthermore, devices for generating the transmit signal $V_{SIG}$ (i.e., devices in the transmitter 606 of FIG. 6) may also be selected to the appropriate bandwidth to operate at the PLC carrier frequency.

Figure 9:
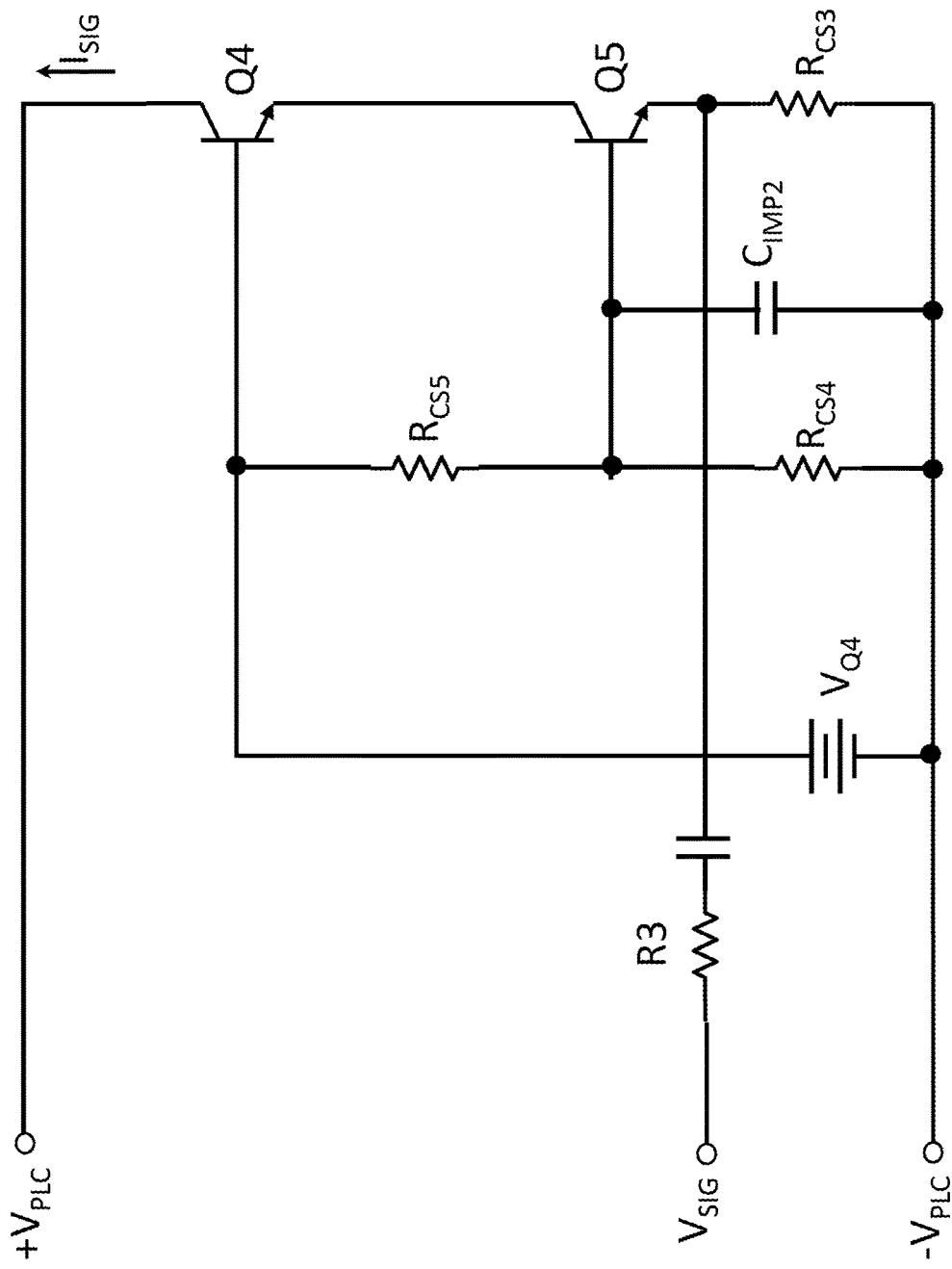
FIG. 9 shows another exemplary circuit architecture of a current source having an output current $I_{SIG}$ connected to the power line, wherein the output current $I_{SIG}$ is modulated by a transmit signal $V_{SIG}$ from a transmitter, according to some embodiments of the disclosure.

FIG. 9 shows another exemplary circuit architecture of a current source having an output current $I_{SIG}$ connected to the power line, wherein the output current $I_{SIG}$ is modulated by a transmit signal $V_{SIG}$ from a transmitter, according to some embodiments of the disclosure. This particular circuit architecture shows a variation on the type of transistor device that can be used as the output driver of the current source. In this circuit architecture, the output driver having transistor Q4 and transistor Q5 are selected to ensure that both Q4 and Q5 operates in the linear operating region in the presence of transients and EMI. Q4 can be a high voltage device which does not breakdown when the transients or EMI on the power line is causing the collector to emitter voltage of Q4 to exceed the breakdown voltage. At the same time Q5 does not have a requirement to be a high voltage device because the collector to emitter voltage of Q5 can be controlled in this circuit architecture. The signal current $V_{SIG}/R3$ can be injected at the emitter of transistor Q5 (which has a low AC impedance to ground due to the capacitor $C_{IMP2}$ connected to the base of Q5) to modulate the output current $I_{SIG}$ according to the transmit signal $V_{SIG}$. In this circuit architecture, the resistor $R_{CS3}$ provides emitter current for Q5 (which can alternatively be provided by other devices (e.g., using current source Q3+$R_{CS1}$ as shown in FIG. 8). Voltage source $V_{Q4}$, $R_{CS4}$, and $R_{CS5}$ bias the bases of Q4 and Q5.

In this circuit architecture, the requirement for Q5 to be a high voltage device is not crucial. To provide the modulated current output, the signal current is injected at the emitter of Q5 to modulate the output current $I_{SIG}$ according to the transmit signal $V_{SIG}$. Depending on the PLC carrier frequency, the device Q5 is preferably selected to have the appropriate bandwidth to operate at the PLC carrier frequency. Furthermore, devices for generating the transmit signal $V_{SIG}$ (i.e., devices in the transmitter 606 of FIG. 6) should also have the appropriate bandwidth to operate at the PLC carrier frequency. In one variation, if Q5 (1) has a sufficiently high breakdown voltage for absorbing transients and changes in voltage across +$V_{PLC}$ and −$V_{PLC}$ and (2) has the appropriate bandwidth to operate at the PLC carrier frequency (frequency of the transmit signal $V_{SIG}$), Q4 can be eliminated (resulting in a circuit architecture similar to the one seen in FIG. 11).

Figure 10:
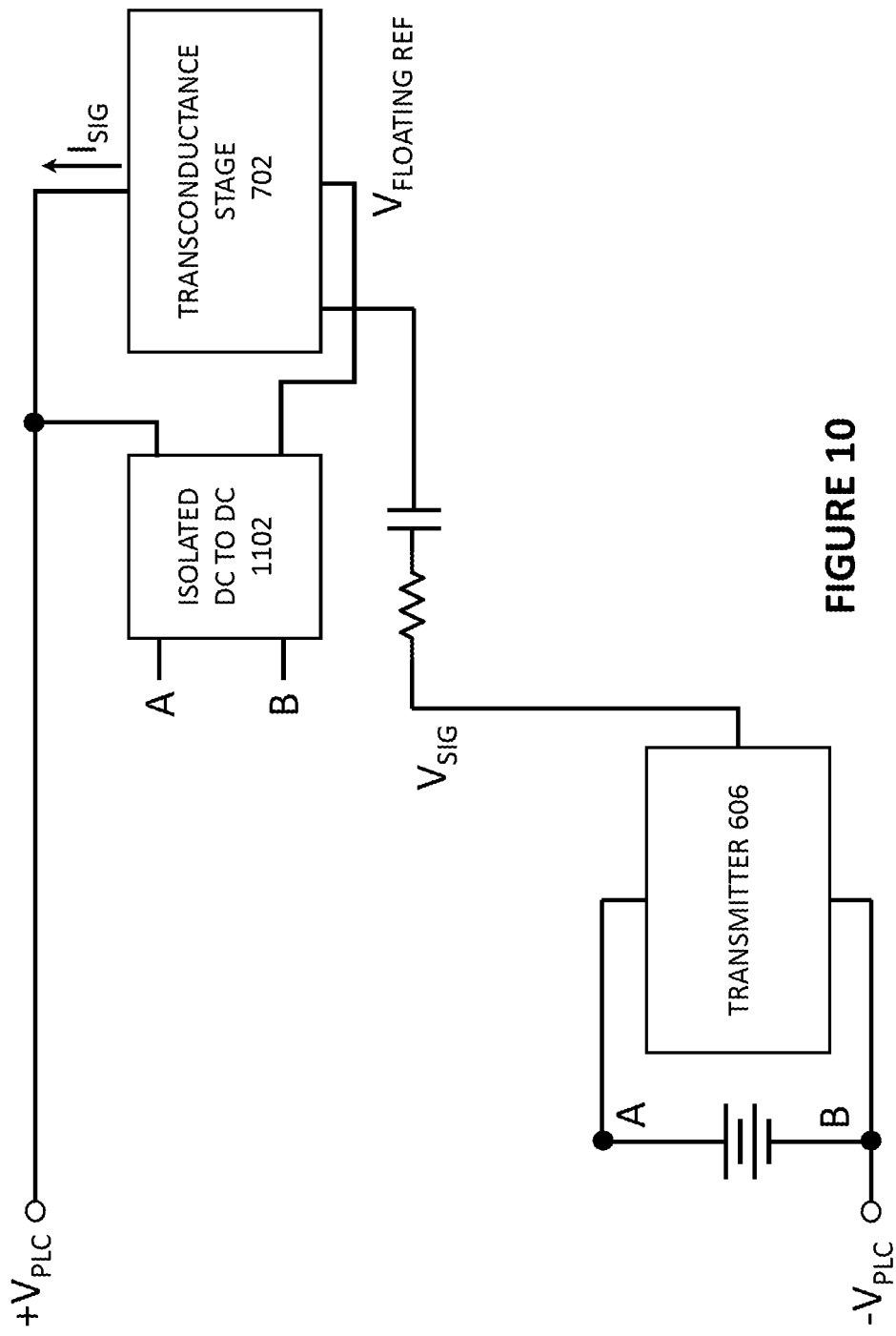
FIG. 10 shows another exemplary PLC system architecture having a current source having an output current $I_{SIG}$ connected to the power line, wherein the output current $I_{SIG}$ is modulated by a transmit signal $V_{SIG}$ from a transmitter, according to some embodiments of the disclosure.

FIG. 10 show another exemplary system architecture having a current source having an output current $I_{SIG}$ connected to the power line, wherein the output current $I_{SIG}$ is modulated by a transmit signal $V_{SIG}$ from a transmitter, according to some embodiments of the disclosure. In some embodiments, the voltages on the power line can vary significantly. In one example, +$V_{PLC}$ can go positive and negative relative to −$V_{PLC}$ if +$V_{PLC}$ and −$V_{PLC}$ are AC power lines. In another example, transients can be a large positive spike and a large negative spike on +$V_{PLC}$ relative to −$V_{PLC}$. In these embodiments, it may be desirable to provide a current source which does not operate with respect to both +$V_{PLC}$ and −$V_{PLC}$ as the positive and negative rails, respectively, but operates with respect to another set of reference voltages, e.g., [+$V_{PLC}$, $V_{FLOATING\ REF}$], [$V_{FLOATING\ REF}$, −$V_{PLC}$], [+$V_{DC}$, −$V_{DC}$], etc. For instance, one or more devices of the current source can operate with respect to a voltage reference that floats with or follows a voltage level of the power line. The result is a constant voltage difference across the transconductance stage 702 (e.g., voltage difference between +$V_{PLC}$ and $V_{FLOATING\ REF}$) in the presence of voltage variations across +$V_{PLC}$ and −$V_{PLC}$. The constant voltage difference reduces the constraints on one or more devices being high breakdown voltage devices or the constraints on one or more devices that would turn off when the voltage is not high enough. By not using both +$V_{PLC}$ and −$V_{PLC}$ as the positive and negative rails for the transconductance stage 702, the one or more devices can maintain in a linear operating region irrespective of the voltage level of the power line (even in the presence of transients and EMI).

In this example, the transconductance stage 702 is biased by +$V_{PLC}$ and a floating reference voltage $V_{FLOATING\ REF}$. The $V_{FLOATING\ REF}$ can be provided using an isolated DC to DC supply 1102 that takes, e.g., voltages at node A and B used by the transmitter 606, to provide a floating reference voltage $V_{FLOATING\ REF}$ that tracks the voltage on +$V_{PLC}$. For instance, suppose the voltage between nodes A and B is 5 volts. Irrespective of the voltage on +$V_{PLC}$ relative to −$V_{PLC}$, the floating reference voltage $V_{FLOATING\ REF}$ can be substantially always 5 volts below +$V_{PLC}$, ensuring that the device(s) in the transconductance stage 702 would operate in the linear region. This can also work for AC voltages where +$V_{PLC}$ may be negative relative to −$V_{PLC}$. Such a solution or other suitable system architectures can make it easier for the devices in transconductance stage 702 to operate in a linear operating region (while having the improved immunity to transients and EMI).

Figure 11:
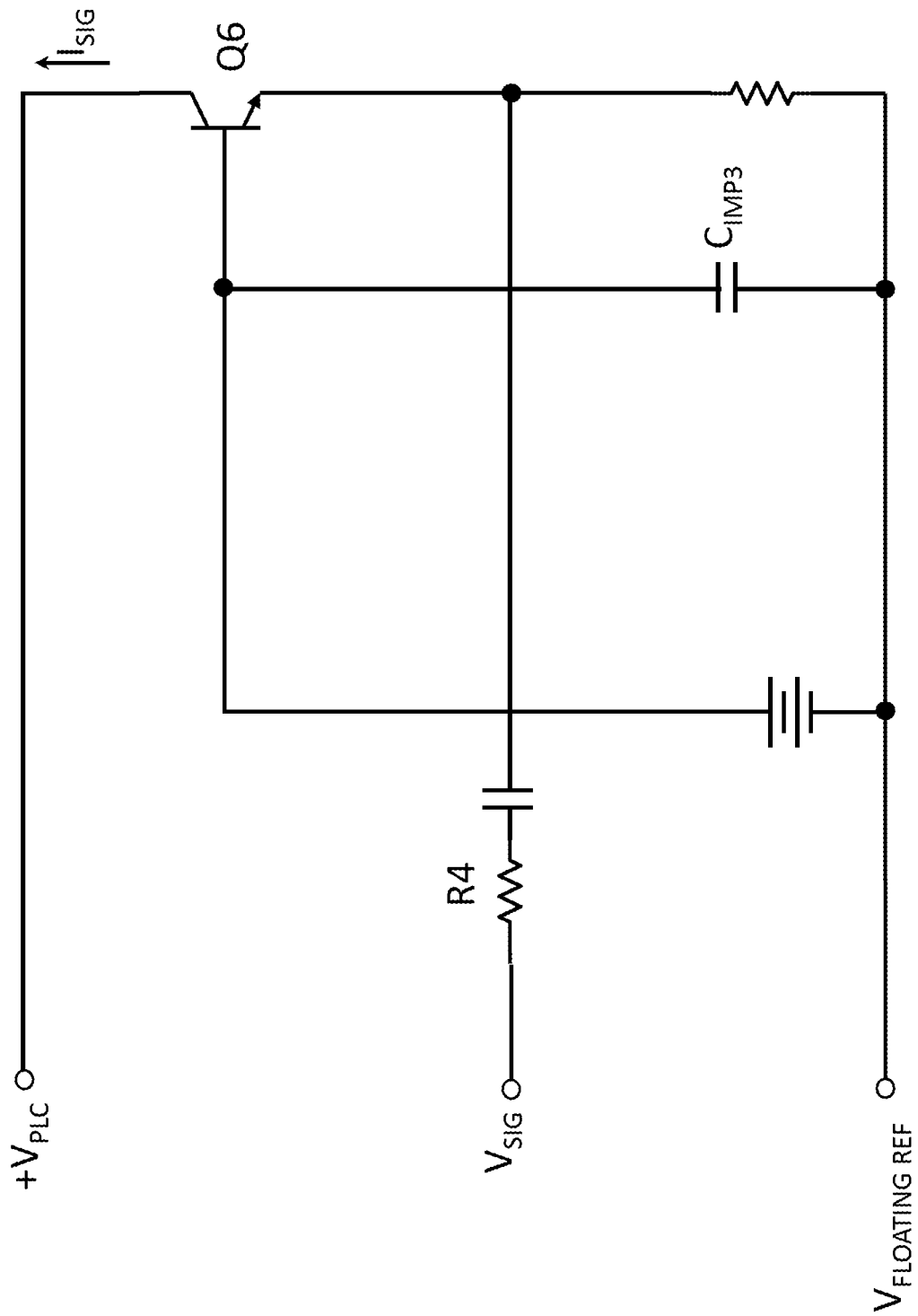
FIG. 11 shows exemplary circuit architecture of a transconductance stage of a current source having an output current $I_{SIG}$ connected to the power line, wherein the output current $I_{SIG}$ is modulated by a transmit signal $V_{SIG}$ from a transmitter, according to some embodiments of the disclosure.

FIG. 11 shows exemplary circuit architecture of a transconductance stage of a current source having an output current $I_{SIG}$ connected to the power line, wherein the output current $I_{SIG}$ is modulated by a transmit signal $V_{SIG}$ from a transmitter, according to some embodiments of the disclosure. For instance, this circuit architecture can be used for transconductance stage 702 of FIG. 10. In this example, Q6 can be a low voltage device (i.e., having a relatively low breakdown voltage requirement) since the voltage difference between +$V_{PLC}$ at the collector of Q6 and the voltage at the emitter of Q6 remains relatively constant due to $V_{FLOATING\ REF}$ following +$V_{PLC}$. The signal current $V_{SIG}$/R4 can be injected at the emitter of transistor Q6 (which has a low AC impedance to ground due to the capacitor $C_{IMP3}$ connected to the base of Q6) to modulate the output current $I_{SIG}$ according to the transmit signal $V_{SIG}$.

Exemplary Front End of the PLC System

Figure 12:
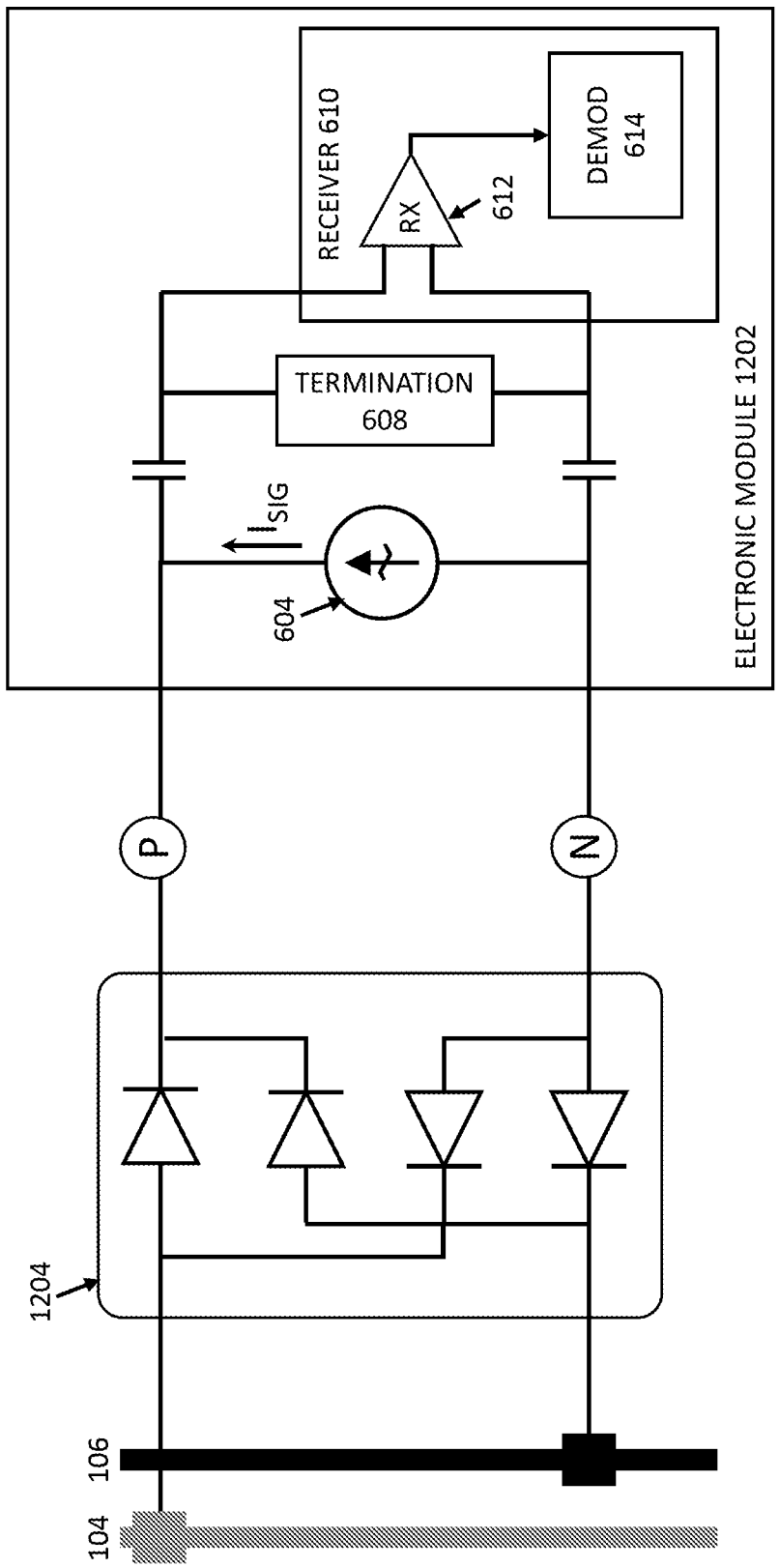
FIG. 12 shows another exemplary electronic module having an improved front end for a PLC, according to some embodiments of the disclosure.

FIG. 12 shows another exemplary electronic module having an improved front end for a PLC, according to some embodiments of the disclosure. To improve the PLC further, some embodiments of electronic module 1202 may be provided with a full wave rectifier 1204 that interfaces between the power line and the circuit for transmitting and/or receiving signals. The full wave rectifier 1204 converts the voltage across the power lines 104 and 106 to a constant polarity where the voltage at node P is positive relative to the voltage at node N. In some cases, the full wave rectifier 1204 can be configured to convert the voltage across the power lines 104 and 106 to a constant polarity where the voltage at node N is positive relative to the voltage at node P. The full wave rectifier 1204 can ensure that devices in the circuit for transmitting and/or receiving signals are operating properly even when the voltage on the power lines exhibits non-DC characteristics. These non-DC characteristics includes AC power which fluctuates from positive to negative (or vice versa), EMI causing voltage to cross the zero-line, transients causing voltage to cross the zero-line, and even reverse battery operation. More importantly, a full wave rectifier 1204 may maintain proper voltage polarity for the electronic module 1202. Since the full wave rectifier 1204 conducts when the voltage on the power line 104 is positive or negative relative to power line 106, the PLC signal continues to be conducted to or from the electronic module 1202, e.g., even in the presence of negative PLC transients. The full wave rectifier 1204 is unlike a diode configuration used for reverse battery protectors, where a diode would not conduct signals to the electronic module 1202 in the presence of negative voltages on the power line 104 relative to power line 106.

The full wave rectifier 1204 can be implemented using four diodes in a bridge configuration, in some instances, can be incorporated with or may replace a reverse battery protector (e.g., obviating the need for providing reverse battery protection 616 of FIG. 6 on the power line). The full wave rectifier 1204 can also be implemented by metal-oxide field effect transistors, and/or other suitable devices.

Exemplary Receiver Cystem

Figure 13:
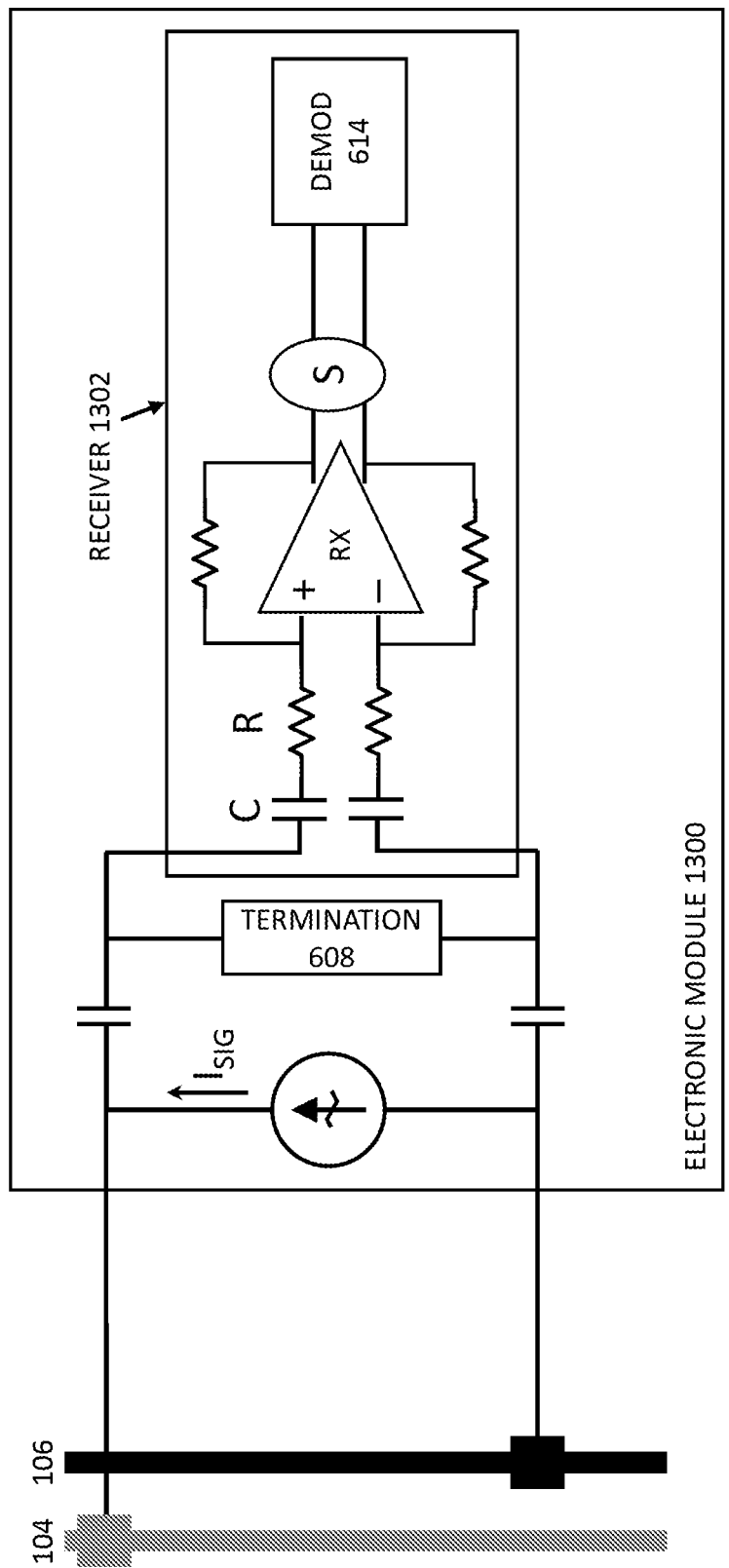
FIG. 13 shows another exemplary electronic module having an improved receiver for a PLC, according to some embodiments of the disclosure.

FIG. 13 shows another exemplary electronic module 1300 having an improved receiver for a PLC, according to some embodiments of the disclosure. In particular, the drawing shows one possible implementation (denoted as receiver 1302) for the receiver 610 of FIG. 6. Referring to FIG. 13, the receiver 1302 includes a differential amplifier, wherein the inputs of the differential amplifier are connected to the power line via at least a capacitor and a resistor. Generally, when there are transients or EMI on the power line, the demodulator can filter out EMI and the extraction of information from the PLC signal is not affected. Furthermore, common mode transients and EMI do not cause an issue for the differential amplifier. However, when there is a large differential transient or EMI on the power line (e.g., interferers which cannot rejected by differential signaling), the output node S may saturate and clip the signal being provided to demodulator 614. The saturation and clipping of the signal can disrupt the ability of the demodulator 614 from properly decoding the data, especially when the clipping of the signal at node S has exceeded the allotted time for demodulating one bit of information.

To address the above mentioned issues caused by a transient or EMI, the amplifier's performance and the value of the termination impedance at the electronic module 1300 (e.g., termination 608) can be selected to minimize or reduce the period or time of saturation at node S (i.e., the output of the differential amplifier).

Generally speaking, the amplifier's performance (e.g., clamping voltage, clamping time, clamping recovery time, frequency response, saturation recovery time, gain, etc.) and other characteristics dependent on the external components to the amplifier can also be selected to alleviate the above mentioned issues. In some embodiments, the RC time constant of the capacitor C and the resistor R at the input to the differential amplifier are carefully selected to ensure the period of saturation is sufficiently limited.

As mentioned in an earlier section related to the flexibility in termination, the value of the node termination impedance affects the amount of signal level at the input of the differential amplifier when a transient or EMI is present on the power line. For that reason, the value of the node termination impedance thus affects whether the output of the differential amplifier would saturate. Based on the expected signal level of the transients and EMI on the power line, the value of the node termination impedance can be selected so as to ensure the signal level of the transients and EMI is not converted into a substantial voltage at the input of the differential amplifier and thus saturating the differential amplifier at node S. For instance, as the signal level of the transients and EMI increases to a higher level, the value of the node termination impedance may be decreased in order to not exceed the capabilities of the differential amplifier.

Viewing the Modulated Current Source and the Termination as a Norton's Equivalent Circuit Many circuit implementations are possible for providing the modulated current source and the termination component of the circuit for transmitting signals over the power line. The circuit implementations can be reformulated such that the Norton's equivalent of the circuit implementation ends up having a modulated current source and a parallel impedance. The Norton equivalent circuit is used to represent any network of linear sources and impedances at a given frequency. Broadly speaking, a suitable circuit implementation for the improved PLC can have a Norton's equivalent circuit that would have an output current modulated by the transmit signal, and a parallel impedance that corresponding to the desired termination at the carrier frequency. In other words, the current source and the termination component can correspond to a Norton's equivalent circuit representation of a suitable circuit implementation.

Variations and Implementations

Note that the features discussed herein with reference to the FIGURES are applicable to any integrated circuits that involve PLCs, particularly those that can transmitting and/or receiving signals over a power line. For illustration, the present disclosure describes modern electronic systems with a PLC in automotive technology. However, the examples described herein are merely provided as an illustration, and one skilled in the art would appreciate that the present disclosure is also applicable in electronic systems in other technologies such as transportation, lighting systems, locomotive, telemetry, machine to machine applications, aerospace, machinery, smart power grid, home area networking, energy, distributed energy generation, or any suitable applications involving PLCs.

In the discussions of the embodiments above, the capacitors, inductors, resistors, amplifiers, switches, transistors, and/or other components can readily be replaced, substituted, or otherwise modified in order to accommodate particular circuitry needs. Moreover, it should be noted that the use of complementary electronic devices (e.g., any suitable linear circuitry can replace the transistors shown in the FIGURES) offer an equally viable option for implementing the teachings of the present disclosure. The circuits shown in the FIGURES are meant to be illustrative, and can be modified based on the particular application.

It is noted that several of the FIGURES shows a transconductance stage for converting a voltage input $V_{SIG}$ to a current output, but it is understood by one skilled in the art that the transconductance stage can be replaced with a current-to-current module, such as a current mirror, for converting a current input into a current output coupled onto the power line. For instance, the current-to-current module can take, e.g., a current output $I_{transmit}$ from transmitter 606 instead of a voltage from transmitter 606 (e.g., removing the resistor and capacitor for converting that voltage into a current). Generally speaking, the current-to-current module includes circuitry for providing an output current that is modulated by the current output $I_{transmit}$ from transmitter 606. The circuitry preferably includes devices with sufficient bandwidth for the carrier frequency and/or sufficiently high breakdown voltage such that the devices can continue to operate in the linear region in the presence of transients and EMI on the power line.

While the disclosure/claims describe the implementations using NPN BJT transistors devices, it is envisioned that complementary configurations using PNP BJT transistor(s) or equivalent metal-oxide-semiconductor field effect transistors (MOSFETS) can also be replace one or more of the NPN BJTs to provide the disclosed circuit implementations. It is understood by one skilled in the art that a transistor device can be generalized as a device having three (main) terminals. Furthermore, it is understood by one skilled in the art that a transistor device, during operation, can have a characteristic behavior of transistors corresponding to devices such as NMOS, PMOS, NPN BJT, PNP BJT devices (and any other equivalent transistor devices).

For instance, the present disclosure/claims encompasses implementations where all NPN devices are replaced by PNP devices. The circuits using PNP devices would be configured in an "upside-down" manner compared to the ones disclosed herein using PNP devices (positive rail and negative rail would be swapped). Varied implementations are equivalent to the disclosed implementations using PNP transistors devices or other equivalent devices configured in an equivalent manner because the varied implementations would perform substantially the same function in substantially the same way to yield substantially the same result. Complementary or equivalent configurations (using MOSFET in place of BJT transistors) would be considered interchangeable with embodiments described herein using BJT transistors to a person with ordinary skill in the art. For instance, when the disclosure/claims mention a "collector" of a BJT device, the disclosure/claims also envisions an equivalent implementation where the "collector" corresponds to the "drain" of a MOSFET. The same goes for "emitter" of a BJT corresponding to the "source" of a MOSFET, and for the "base" of a BJT corresponding to the "gate" of a MOSFET.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the PLC functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

What is claimed is:

1. A circuit for transmitting and receiving signals over a power line in a presence of one or more transient and electromagnetic interference on the power line, the circuit comprising:
    terminals for coupling the circuit to the power line and receiving power from a power source;
    a current source having an output current connected to the power line via one of the terminals;
    a transmitter for modulating the output current of the current source based on a transmit signal; and
    a receiver coupled to the power line in parallel with the current source via the terminals, said receiver for receiving current signals carried on the power line transmitted by other circuits receiving power from the power line.

2. The circuit of claim 1, wherein the output current is substantially independent of load at an output of the current source.

3. The circuit of claim 1, wherein the output current is substantially independent of voltage on the power line.

4. The circuit of claim 1, wherein an output impedance of the current source is controlled.

5. The circuit of claim 1, further comprising a termination component connected to the power line in parallel with the current source.

6. The circuit of claim 5, wherein the termination component is adjustable to improve signal transfer based on a measurement made by the receiver.

7. The circuit of claim 1, wherein one or more devices of the current source operate with respect to a voltage reference that floats with or follows a voltage level of the power line while the one or more devices maintain in a linear operating region irrespective of the voltage level of the power line.

8. The circuit of claim 1, wherein the power line is a direct current power line.

9. The circuit of claim 1, wherein the power line is an alternating current power line.

10. The circuit of claim 1, wherein:
    the receiver comprises a differential amplifier; and
    characteristics of the differential amplifier are selected such that a period of saturation at an output of the differential amplifier caused by a transient is limited to allow a demodulator to correctly demodulate one bit of information from the output of the differential amplifier.

11. The circuit of claim 1, further comprising:
    a full wave rectifier that interfaces between the power line and the circuit.

12. The circuit of claim 1, wherein:
    the receiver comprises a differential amplifier; and
    inputs of the differential amplifier are connected to the power line via at least a capacitor and a resistor.

13. A method for transmitting and receiving signals over a power line in a presence of transient(s) and electromagnetic interference on the power line, the method comprising:
    receiving, by an electronic apparatus, power from a power source over a power line;
    generating a transmit signal using a transmitter in the electronic apparatus;
    modulating an output current of a current source in the electronic apparatus connected to the power line using the transmit signal; and
    receiving a current signal carried on the power line by a receiver in the electronic apparatus connected to the power line in parallel with the transmitter and the current source, wherein the current signal is transmitted by another apparatus receiving power from the power source over the power line.

14. The method of claim 13, further comprising:
    adjusting a termination component connected to the power line in parallel with the transmitter and the current source to improve signal transfer based on a measurement made by the receiver.

15. The method of claim 14, wherein:
    modulating the output current of the current source comprises modulating the output current substantially independent of load at the output of the current source.

16. The method of claim 14, wherein:
    modulating the output current of the current source comprises modulating the output current substantially independent of voltage on the power line.

17. A full duplex power line communication system comprising:

an interface for coupling the full duplex power line communication system to a power line and receiving power from a battery via the power line;

a transmitter for generating a transmit signal and outputting an output current to the power line via the interface, wherein the output current is modulated by the transmit signal; and a receiver, capacitively coupled to the power line and in parallel with a current source of the transmitter, for receiving current signals transmitted on the power line by one or more other power line communication systems which are coupled to power line and receiving power from the battery.

18. The full duplex power line communication system of claim 17, further comprises:

a tracker for tracking voltages of the power line and biasing devices in a transconductance stage of the transmitter to operate in a linear operating region.

19. The full duplex power line communication system of claim 17, further comprising:

an isolated direct current to direct current supply for generating a reference voltage for a transconductance stage of the transmitter, wherein the reference voltage tracks a voltage on the power line.

* * * * *